(12) United States Patent
Martin et al.

(10) Patent No.: US 6,227,426 B1
(45) Date of Patent: May 8, 2001

(54) BAT, BALL AND GLOVE CADDY FOR A BICYCLE

(76) Inventors: Martin T. Martin; Eleanor L. Martin, both of 1706 Manor Dr. NE., Alexandria, Douglas, MN (US) 56308; Dolly R. Martin, 245 Aurora Ave., Lowry, Pope, MN (US) 56308

(*) Notice: Subject to any disclaimer, the term of this patent is extended or adjusted under 35 U.S.C. 154(b) by 0 days.

(21) Appl. No.: 09/523,720

(22) Filed: Mar. 11, 2000

(51) Int. Cl.[7] .................................................. B62J 7/06
(52) U.S. Cl. ........................ 224/421; 224/422; 224/428; 224/433; 224/442
(58) Field of Search ........................ 224/420, 421, 224/422, 424, 428, 433, 440, 441, 442, 451, 452

(56) References Cited

U.S. PATENT DOCUMENTS

| | | | |
|---|---|---|---|
| 579,279 | * | 3/1897 | McCormack ........................ 224/462 |
| 3,938,719 | * | 2/1976 | Carlton .............................. 224/419 |
| 3,987,944 | | 10/1976 | Shearer, Sr. et al. . |
| 4,069,956 | | 1/1978 | Shearer, Sr. et al. . |
| 4,282,993 | * | 8/1981 | Humlong ............................ 224/431 |
| 4,450,988 | * | 5/1984 | Meisel ................................ 224/430 |
| 4,817,833 | * | 4/1989 | Rebera ............................... 224/418 |
| 5,775,559 | * | 7/1998 | Mechanic et al. ................... 224/434 |
| 6,029,874 | * | 2/2000 | Meggitt .............................. 224/412 |

* cited by examiner

*Primary Examiner*—Stephen K. Cronin
(74) *Attorney, Agent, or Firm*—Albert W Watkins

(57) ABSTRACT

A carrier includes supports that attach to opposite sides of the axle of a steerable wheel. Extending generally vertically from the supports are cylindrical tubes that accommodate long and narrow cargo such as baseball and softball bats. The tubes are held near the top by a first bracket extending between them. A second bracket is attached to the first through an elongated slot, and secures the first bracket to the vehicle, for example, at the steering column. The carriers extend vertically beyond the first bracket and so provide support for baseball and softball gloves and mitts. A ball container is suspended from the first bracket between the tubes. When the steering column and steerable wheel are rotated, the carrier rotates also, thereby preventing interference between the carrier and the transportation device. While the invention has application with other transportation devices, particular synergy is found when the inventive carrier is used in combination with a bicycle.

15 Claims, 2 Drawing Sheets

BAT, BALL AND GLOVE CADDY FOR A BICYCLE

BACKGROUND OF THE INVENTION

1. Field of the Invention

This invention pertains generally to carriers, and more specifically to bicycle mounted carriers adapted to carry one or more bats, balls, and gloves.

2. Description of the Related Art

As soon as man devised ways to transport himself about more quickly and efficiently than on foot, he was also faced with the challenge of finding new ways to simultaneously transport belongings or supplies. Through the ages, animals, and then, later, various machines have been used for transportation. A multitude of carriers have been created, some for very specific cargo or modes of transport and others for a wide variety of cargo sizes and types. The present invention, a carrier for bats, balls, and gloves such as might be used in baseball or softball, finds the greatest utility when used in combination with the bicycle.

The bicycle has only minimal weight, and, while faster than a person on foot, normally attains speeds low enough to pose only minimal danger to the safety and well-being of a bicyclist. Owing in part to the small mass and low speeds, a bicyclist also poses little danger to others. Consequently, bicycles have been and continue to be a very significant mode of transportation for persons of all ages.

Most of the time, bicycles and children make a good combination. However, bicycles do not inherently provide good cargo carrying capability. This is particularly true of long or bulky cargo, such as a baseball bat. Unfortunately, not only do children frequently ride bicycles, but they also frequently play baseball. Since baseball diamonds require a significant amount of land space, they are often centrally located within parks or community centers. When children get together to play baseball, some may walk and others may get a ride in an automobile. There will, however, always be a number of children present who have come to the game by riding their bicycle.

When faced with the challenge of transporting a baseball bat, children will typically try to carry the bat in their hands. One way this may be accomplished is by laying the bat across the handle bars, transverse to the longitudinal axis of the bicycle. This technique works well when the bicycle rider is traveling straight forward, with no obstacles on either side. However, there will always be obstacles, including such things as parked cars, street signs, buildings, pedestrians and other bicycles. Because the baseball bat will typically extend farther to the sides than the bicycle or the rider, a bicyclist carrying a transverse bat will frequently swerve to avoid these obstacles. This, of course, endangers the bicyclist.

Another way to carry the bat is parallel to the longitudinal axis of the bicycle. In this case, the bicyclist will attempt to hold the bat simultaneous with the handle grip. This can be terribly precarious, since, when the rider turns a corner or hits a bump, the bat may slip or pivot in the rider's grip and interfere with the wheel spokes. As is immediately apparent, the rider may be thrown from the bike and seriously injured.

Safe recreation is recognized as being highly beneficial to the proper development of children. Consequently, it is desirable to encourage children to participate in baseball, regardless of the mode of transportation required. However, bats pose a particular hazard to bicycles, since the length and weight of the bats make them very difficult to handle while still safely gripping handle bars on the bicycle. In the worst case, particularly during larger baseball games, many young baseball players may be riding their bicycles in the vicinity of automobiles. To risk just one of those children accidentally entangling a bat in the wheel spokes and being hit by a car is unacceptable, and every effort needs to be made to ensure the safety of the young baseball players.

Several attempts have been made in the prior art to accommodate baseball bats and balls. Exemplary of these are U.S. Pat. Nos. 3,987,944 and 4,069,956 to David Shearer, Sr., and David Shearer, Jr. In these two patents, two different carriers are illustrated that can be used in combination with a bicycle. The older of the two patents illustrates an under-seat bat support. While the support will provide a safer means for transporting a baseball bat, some drawbacks may also be observed. In that disclosure, the bat extends under a banana seat in a somewhat parallel to the ground orientation. This limits the applicability of that carrier to those bikes that either have a banana seat or that alternatively offer connection points that will accommodate the carrier. Furthermore, since the bat extends substantially behind the seat, a person will find it difficult to swing their leg over the seat to sit down on the bicycle. The more recent of the two patents illustrates a ball carrier. However, the ball carrier and bat must coexist in the same space under the seat. This will, depending upon the model of the bicycle, prove to be difficult or impossible in some instances.

SUMMARY OF THE INVENTION

In a first manifestation, the invention is a bat, ball and glove caddy for a bicycle. The caddy includes a support for structurally attaching to the front axle. An elongated container is structurally attached to the support, and has an opening for receiving and retaining a bat during bicycling. A first bracket rigidly and adjustably spaces the elongated container from the bicycle.

In a second manifestation, the invention is a carrier for carrying bats, ball and gloves upon a velocipede. The carrier includes a first support for structurally attaching to a first side of a front axle of the velocipede, and a first elongated container attached to the first support that extending longitudinally therefrom. The elongated container has an opening at a second end longitudinally opposite the first end for receiving a bat. A second support structurally attaches a second elongated container to a second side of the front velocipede axle. A first bracket spaces the first elongated container from the second, while tending to maintain a fixed relative orientation between the two. A ball carrier is provided between the two elongated containers. A second bracket rigidly and adjustably spaces the first bracket from the velocipede.

In a third manifestation, the invention is a tote for transporting bats, balls and gloves upon a steerable wheel of a wheeled transportation means. The tote has a means for supporting a bat during transport by the wheeled transportation means; a first means for attaching the supporting means to the steerable wheel; and a second means for attaching the supporting means to the wheeled transportation means distal to the steerable wheel. The supporting means moves with the steerable wheel when the steerable wheel is rotated.

OBJECTS OF THE INVENTION

A first object of the present invention is to provide a compact carrier for baseball bats, balls, and gloves which does not interfere in any way with the operation or travel of the bicycle. A second object of the present invention is to provide a carrier capable of independently or simultaneously supporting a plurality of bats, balls, and gloves. Another object of the present invention is to transport baseball bats in a substantially vertical orientation, thereby alleviating any risk of losing the bats during transport. A further object of the present invention is to place the carrier in plain view of the bicyclist, while not distracting the bicyclist from safe driving. Yet another object of the present invention is to enable a person of only limited mechanical skills to install the carrier. An additional object of the present invention is to enable rapid removal of the carrier from the bicycle, so that the carrier may be easily removed when desired. Yet a further object is to enable a ball carrier to be formed for different ball sizes. These and other objects are achieved in the present invention, which will be best understood from a description of the preferred embodiment.

DESCRIPTION OF THE PREFERRED EMBODIMENT

Figure 1:
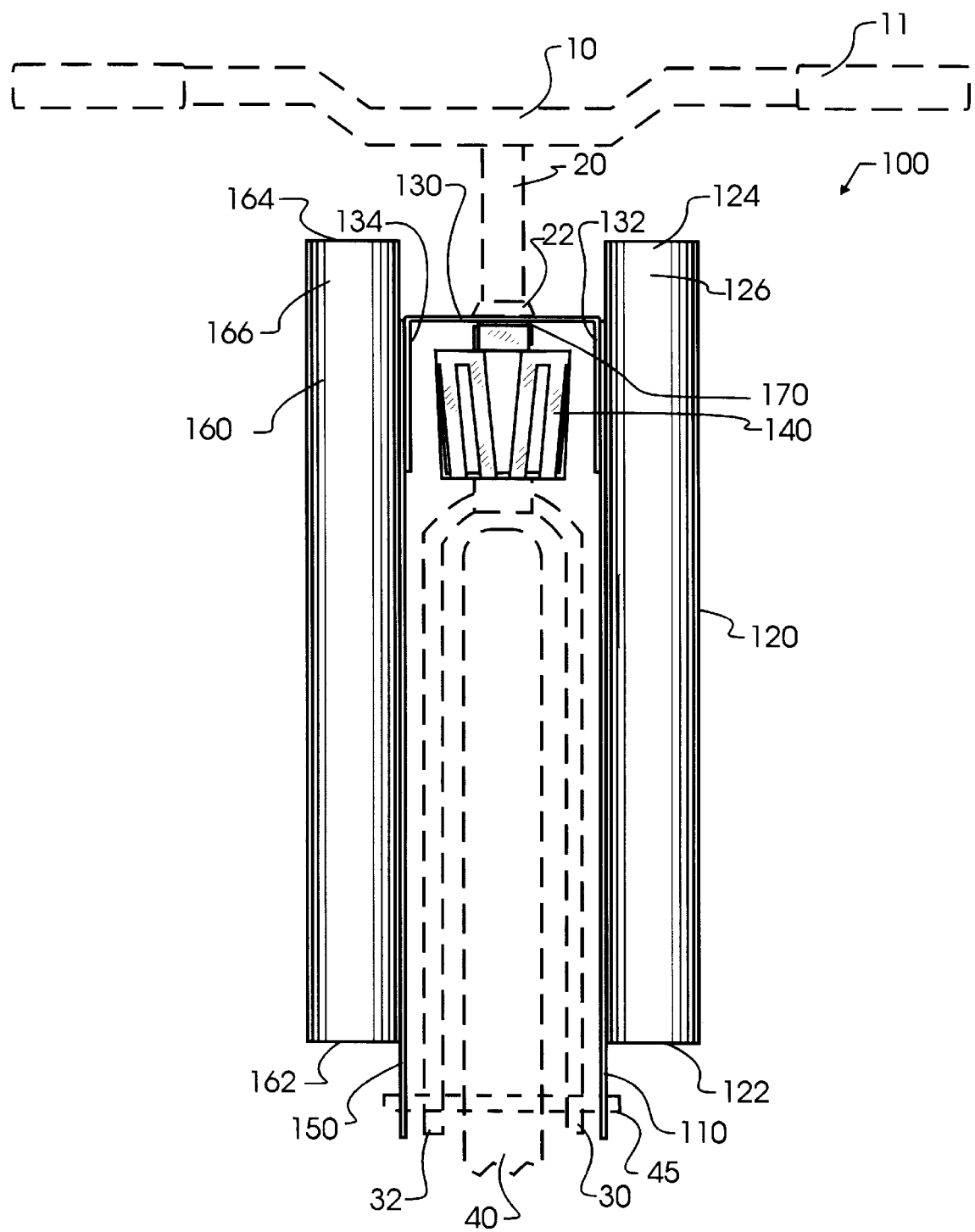
FIG. 1 illustrates a preferred embodiment carrier designed in accord with the teachings of the present invention from a front view, in combination with a bicycle illustrated by phantom lines.

Preferred embodiment carrier 100 is illustrated in FIG. 1 in combination with a bicycle front wheel, shown with phantom lines. A typical bicycle includes handle bars 10 and hand grips 11. As is known, handle bars 10 are rotated to steer and change the direction of travel of the bicycle. Extending perpendicularly from the center of handle bars 10 is a steering column 20. Column 20 passes through a top bearing structure 22 and connects ultimately with front fork left and right side pieces 30 and 32. Wheel 40 rotates on axle 45, which is attached near the ends of left and right fork pieces 30 and 32. Carrier 100 is preferably designed to attach directly to front axle 45. Support 110 is attached adjacent front fork pieces 30, while support 150 is attached adjacent front fork piece 32. Supports 110 and 150 may be bolted, quick-clamped or otherwise fastened onto axle 45, using any ofthe suitable fasteners known in the art. They are most preferably formed from channel aluminum ⅛ inch thick, one inch wide, 21 inches long, and ¼ inch high in the direction of the channel. Aluminum is most preferred due to its inherent corrosion resistance, ease of manufacture, and high strength to weight ratio. Other suitable materials may also be used, including such things as plastics, painted or plated steel, stainless-steel, and other similar materials. A specific selection of a material may be made in light of the remainder of this disclosure.

Elongated containers 120 and 160 are rigidly affixed to supports 110 and 150, respectively. While containers 120 and 160 may be other suitable sizes and shapes, they are most preferably cylindrical, and two inches in inside diameter. This size has been found to be most suitable for transporting baseball and softball bats, and is readily commercially available. Containers 120 and 160 may be formed from any suitable material that meets the other requirements of the present invention. Most preferably, containers 120 and 160 will be low-cost, corrosion resistant, durable, and relatively lightweight. A most preferred material is PVC drain pipe having a 2⅜ inch outside diameter. The outer diameter of containers 120 and 160 will pass into the inner portion of u-shaped supports 110 and 150, most preferably to engage supports 110 and 150 along three distinct lines of contact. These lines of contact will be between each extension forming the channel, and the center of the channel. Containers 120 and 160 may then be riveted securely to supports 110 and 150. As is apparent, supports 110 and 150 may take on other geometries, including flat or circular cross sections, instead of the u-shaped cross-section most preferred herein. These alternative geometries will not have the intrinsic strength of the u-shaped channel, though, once again, those of ordinary skill in the field will be able to determine satisfactory thickness and cross-sections for a given support material. Similarly, attachment methods other than riveting may be suitable for some applications. Containers 120 and 160 in the preferred embodiment carrier 100 are open at ends 122 and 162 as well as at ends 124 and 164. Leaving ends 122 and 162 open allows moisture, dirt, and other debris to pass freely out of containers 120 and 160. By not closing ends 122 and 162, the manufacture of carrier 100 is also simplified somewhat. The openings at ends 124 and 164 allow baseball or softball bats to be inserted knob first into containers 120 and 160. At some distance, depending upon the shapes and sizes of the bats, the bats will engage with openings 124 and 164 and not pass any further into containers 120 and 160. Particularly where a slightly resilient material is used for containers 120 and 160, the bats will be securely and quietly retained therein for transport.

A c-shaped bracket 130 is used to support containers 120 and 160 near the top openings 124 and 164. Bracket 130, like supports 110 and 150, may be formed from a variety of materials. Bracket 130 will most preferably be corrosion resistant, rigid, and lightweight, and may be selected from materials similar to the materials used in the manufacture of supports 110 and 150. There is no requirement that bracket 130 be made from exactly the same material as supports 110 and 150, though there will be times when it is desirable to do so. In the preferred embodiment, bracket 130 is manufactured from a ⅛ inch thick material and is 13 total inches in length. Bracket 130 has vertically extending legs 132 and 134 that are each most preferably four inches in length. This leaves a 5 inch section spacing containers 120 and 160. Bracket 130 most preferably will be attached to supports 110 and 150 and containers 120 and 160 simultaneous with the riveting of supports 110 and 150 to containers 120 and 160. This may be accomplished by using slightly longer rivets where the rivet must pass through bracket 130 as well as supports 110, 150 and containers 120, 160.

As is the best seen in FIG. 1, containers 120 and 160 will most preferably extend beyond bracket 130, as shown by extensions 126 and 166. These extensions are most preferably provided to support a baseball glove, simply by draping the glove wrist strap over end 124, or, alternatively, end 164. By providing extensions 126 and 166, a baseball glove may be transported upon carrier 100 regardless of whether carrier 100 is also transporting a bat.

A ball carrier 140 is also most preferably provided, and may, for example, be suspended from bracket 130 between containers 120 and 160. Ball carrier 140 may be manufactured in many dimensions and geometries, but will most preferably be manufactured to securely retain a ball therein. One construction which has been found to be suitable is a beverage or cup holder which is designed for cups of outside diameter approximating that of a baseball. These cup holders may be manufactured from an elastomeric material, which offers some resilience and also the ability to accommodate balls of differing sizes. Appropriate selection of material, such as, for example, Nylon, allows carrier 140 to be thermally reformed to accommodate different ball diameters.

Figure 2:
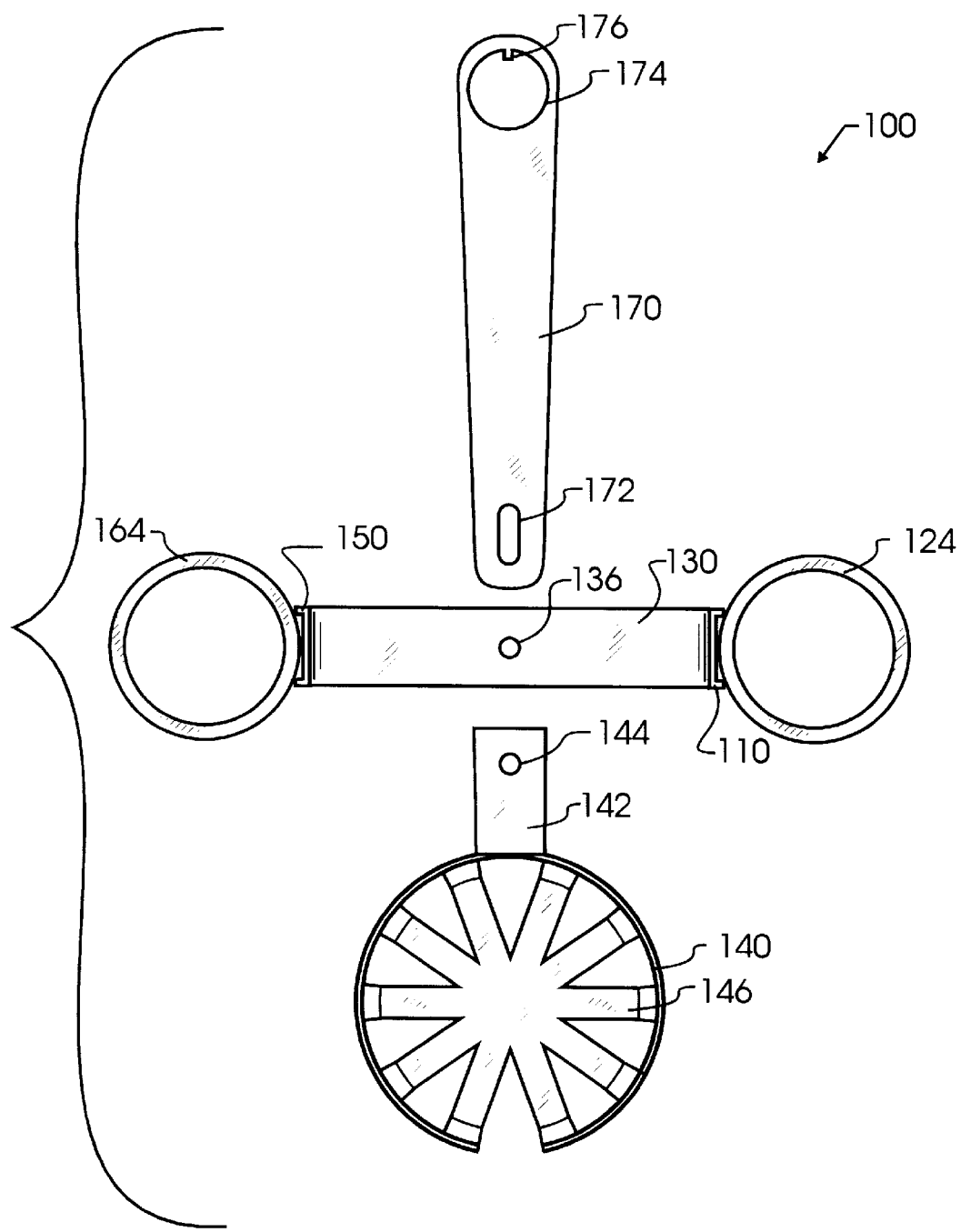
FIG. 2 illustrates the preferred embodiment carrier of FIG. 1 from a top exploded view.

FIG. 2 illustrates carrier 100 from an exploded top view, without illustrating bicycle 10. From this view, several features which were not visible in FIG. 1 are much more discernible. Bracket 170 is provided to securely support carrier 100 from the steering column 20 of a bicycle or other steered-wheel vehicle. Hole 174 is provided therein to allow, for example, column 20 to pass through. A small tab 176 is most preferably provided, to engage with a small slot typically formed in bicycle columns such as column 20. As handle bar 10 and column 20 are rotated by a rider, tab 176 will ensure rotation of bracket 170 therewith. Since supports 110 and 150 are securely affixed to axle 45, both bracket 170 and supports 110 and 150 will rotate in unison, together with handle bars 10. This rotation insures that carrier 100 will effortlessly track with the front wheel 40, and not get in the way. Other methods may be conceived of to engage bracket 170 with column 20, while not departing from the essence of the invention. Nevertheless, bracket 170 is most preferred due to the simplicity of manufacture, which may be achieved by a simple stamping process. Slot 172 has been provided to allow bracket 130 to be adjusted through a variable distance from hole 174. This allows carrier 100 to be attached to bicycles that have differing distances in the longitudinal direction of travel from column 20 to axle 45. Most preferably, containers 120 and 160 will be adjusted to be vertical or nearly vertical during use. This allows carrier 100 to support relatively long bats or other cargo during transport, without interfering with the operation of the bicycle or the bicyclist.

Bracket 130 includes a hole 136 through which a bolt or other similar fastener may be inserted. Hole 136 will be aligned with slot 172 and hole 144 in ball carrier 140, and then an appropriate fastener will be passed through. FIG. 2 also illustrates the top view of ball holder 140. A small tab 142 is provided which allows carrier 140 to be suspended in association with bracket 130. A web 146 or other similar structure is preferably provided to support a ball in ball holder 140, while still allowing water and debris to pass through.

While the foregoing details what is felt to be the preferred embodiment of the invention, no material limitations to the scope of the claimed invention are intended. Further, features and design alternatives that would be obvious to one of ordinary skill in the art are considered to be incorporated herein. For example, while the most preferred embodiment illustrates two carriers 120 and 160, given the present disclosure it will be apparent to those skilled in the art that it would be possible to include only one container 120, or a plurality of containers, while not departing from the other teachings of the invention that are provided herein. Containers 120 and 160 most preferably include open ends 122 and 162. Once again, however, it will be apparent to those skilled in the art after a review of the present disclosure, that it would also be possible to either include an open web such as web 146 found in ball carrier 140, or to completely enclose ends 122 and 160, perhaps with the provision of a small drainage hole. Furthermore, while the inclusion of a ball holder 140 is most preferred, ball holder 140 may be removed, or replaced with other suitable structures. The materials that are recited herein are believed to offer the greatest benefit and synergy in the workings and performance of the present invention. However, a variety of materials have been discussed, and others will be contemplated by those skilled in the art. Therefore, the scope of the invention is set forth and particularly described in the claims hereinbelow.

We claim:

1. A bat, ball and glove caddy for a bicycle, comprising:
    a first support for structurally attaching to a front axle of said bicycle;
    a first elongated container structurally attached to said first support having a first end and extending longitudinally therefrom, and having an opening for receiving and retaining a bat therein during bicycling;
    a first bracket rigidly and adjustably spacing said first elongated container from said bicycle; and
    a ball carrier adjacent said first bracket.

2. The bat, ball and glove caddy for a bicycle of claim 1, wherein said first bracket further comprises a hole through which said bicycle's handle bar stem will pass.

3. The bat, ball and glove caddy for a bicycle of claim 1 wherein said first bracket attaches to said first elongated container between said first end and said opening and said first elongated container extends beyond said first bracket and in a direction to receive and support a glove thereon.

4. The bat, ball and glove caddy for a bicycle of claim 1, wherein said first elongated container comprises a tube.

5. The bat, ball and glove caddy for a bicycle of claim 4, wherein said first elongated container is opened at said first end.

6. The bat, ball and glove caddy for a bicycle of claim 1, wherein said first support is attached to a first side of said front axle.

7. The bat, ball and glove caddy for a bicycle of claim 6, wherein said first support is attached to said first elongated container adjacent said first end of said first elongated container, and said opening in said first elongated container is at a second end longitudinally opposite said first end.

8. The bat, ball and glove caddy for a bicycle of claim 6, further comprising:
    a second support for structurally attaching to a second side opposite said first side of said front axle of said bicycle; and
    a second elongated container structurally attached to said support having a first end and extending longitudinally therefrom, and having an opening for receiving a bat therein.

9. The bat, ball and glove caddy for a bicycle of claim 8, wherein said second support is attached to said second elongated container adjacent said first end of said second elongated container, and said opening in said second elongated container is at a second end longitudinally opposite said first end.

10. The bat, ball and glove caddy for a bicycle of claim 9 further comprising a second bracket rigidly spacing said first container from said second container while tending to maintain a fixed relative orientation between said first container and said second container.

11. A carrier for carrying bats, ball and gloves upon a velocipede, comprising:
    a first support for structurally attaching to a first side of a front axle of said velocipede;
    a first elongated container attached to said first support adjacent a first end and extending longitudinally therefrom, and having an opening at a second end longitudinally opposite said first end for receiving a bat therein;
    a second support for structurally attaching to a second side opposite said first side of said front axle of said velocipede;
    a second elongated container attached to said second support adjacent a first end and extending longitudinally therefrom, and having an opening at a second end longitudinally opposite said first end for receiving a bat therein;

a first bracket rigidly spacing said first elongated container from said second elongated container while tending to maintain a fixed relative orientation between said first elongated container and said second elongated container;

a ball carrier between said first elongated container and said second elongated container; and a second bracket rigidly and adjustably spacing said first bracket from said velocipede.

12. The carrier of claim 11 wherein said first and second elongated containers extend vertically from said front axle.

13. The carrier of claim 11 wherein said second bracket further comprises a hole through which said velocipede steering column passes.

14. The carrier of claim 13, wherein said second bracket rotates with rotation of said velocipede steering column, and said first and second supports rotate with rotation of said front axle.

15. The carrier of claim 13, wherein wherein said first bracket attaches to said first elongated container between said first end and said opening and said first elongated container extends beyond said first bracket and in a direction to receive and support a glove thereon.

* * * * *